US011772439B2

(12) United States Patent
Taillefer

(10) Patent No.: US 11,772,439 B2
(45) Date of Patent: Oct. 3, 2023

(54) AMPHIBIOUS VEHICLE WITH RETRACTABLE FLOATERS

(71) Applicant: Robert Taillefer, Gatineau (CA)

(72) Inventor: Robert Taillefer, Gatineau (CA)

(73) Assignee: Robert Taillefer, Gatineau (CA)

( * ) Notice: Subject to any disclaimer, the term of this patent is extended or adjusted under 35 U.S.C. 154(b) by 205 days.

(21) Appl. No.: 17/215,853

(22) Filed: Mar. 29, 2021

(65) Prior Publication Data
US 2022/0305856 A1    Sep. 29, 2022

(51) Int. Cl.
*B60F 3/00* (2006.01)
*B63H 21/17* (2006.01)
*B63B 1/14* (2006.01)

(52) U.S. Cl.
CPC .......... *B60F 3/0038* (2013.01); *B60F 3/0007* (2013.01); *B60F 3/0061* (2013.01); *B63B 1/14* (2013.01); *B63H 21/17* (2013.01); *B63B 2001/145* (2013.01)

(58) Field of Classification Search
CPC ........ B60F 3/00; B60F 3/0038; B60F 3/0007; B60F 3/0061; B63B 1/14; B63B 2001/145; B63H 21/17
See application file for complete search history.

(56) References Cited

U.S. PATENT DOCUMENTS

| | | | |
|---|---|---|---|
| 3,548,770 A * | 12/1970 | Boutros | C02F 3/16 261/120 |
| 6,009,822 A * | 1/2000 | Aron | B63H 25/46 440/49 |
| 6,840,825 B1 | 1/2005 | Messano | |
| 8,454,399 B1 * | 6/2013 | Zelechonok | B60F 3/0069 440/12.51 |
| 2002/0025734 A1 | 2/2002 | Redman | |
| 2020/0254838 A1 * | 8/2020 | Fisher | B60F 3/0015 |

OTHER PUBLICATIONS

Office Action issued by the Canadian Patent Office for Canadian Patent Application No. 3,113,512, dated Aug. 17, 2022 (4 pages).

* cited by examiner

*Primary Examiner* — Stephen P Avila
(74) *Attorney, Agent, or Firm* — Moffat & Co

(57) ABSTRACT

There is provided an amphibious vehicle for use on land and water comprising lateral floaters which increases the stability of the vehicle when in water. While on land, the lateral floaters may be retracted within the body of the vehicle to reduce the width of the vehicle.

12 Claims, 5 Drawing Sheets

AMPHIBIOUS VEHICLE WITH RETRACTABLE FLOATERS

FIELD OF THE DISCLOSURE

The present disclosure relates to amphibious vehicles that can travel both on land and water. More specifically, the present disclosure relates to an improvement to amphibious vehicles for increasing stability of the vehicle while on water without sacrificing operation of the amphibious vehicle while on land.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

Amphibious vehicles are a popular way for tourists to visit locations, as they allow for traveling down roads and waterways. However, by their very nature amphibious vehicles are a compromise between a land vehicle and a boat, leading to many potential safety issues. While traveling on water, a wider vehicle is generally a more stable vehicle. However, due to restrictions to vehicle traveling on roadways, amphibious vehicles cannot be constructed with an arbitrarily wide body.

Furthermore, as the use of amphibious vehicles is often associated with tourism, safety is a critical concern. The age of passengers of an amphibious vehicle may vary wildly, and may include young children as well as old people. Accordingly, any improvement in the safety of an amphibious vehicle may save lives, as well as giving potential customers greater confidence in the amphibious vehicle.

SUMMARY

The present disclosure is directed to an amphibious vehicle, comprising a hull, defining a watertight compartment; a plurality of ground engaging wheels operatively connected to a first power source; a water propulsion system operatively connected to a second power source; at least one floater extending laterally from each of a left side and a right side of the hull.

The present disclosure provides an improved amphibious vehicle providing increased safety and stability while operating on water, without the amphibious vehicle becoming too wide for safely traveling on the road.

This is achieved by providing lateral floaters on each side of the amphibious vehicle, whereby the lateral floaters can be placed in a first position for traveling on land, with the lateral floaters placed within the hull of the vehicle, and a second position for traveling on water, with the lateral floaters extending laterally from each side of the vehicle.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The present disclosure will be better understood having regard to the drawings in which.

DETAILED DESCRIPTION OF THE DRAWINGS

Figure 1:
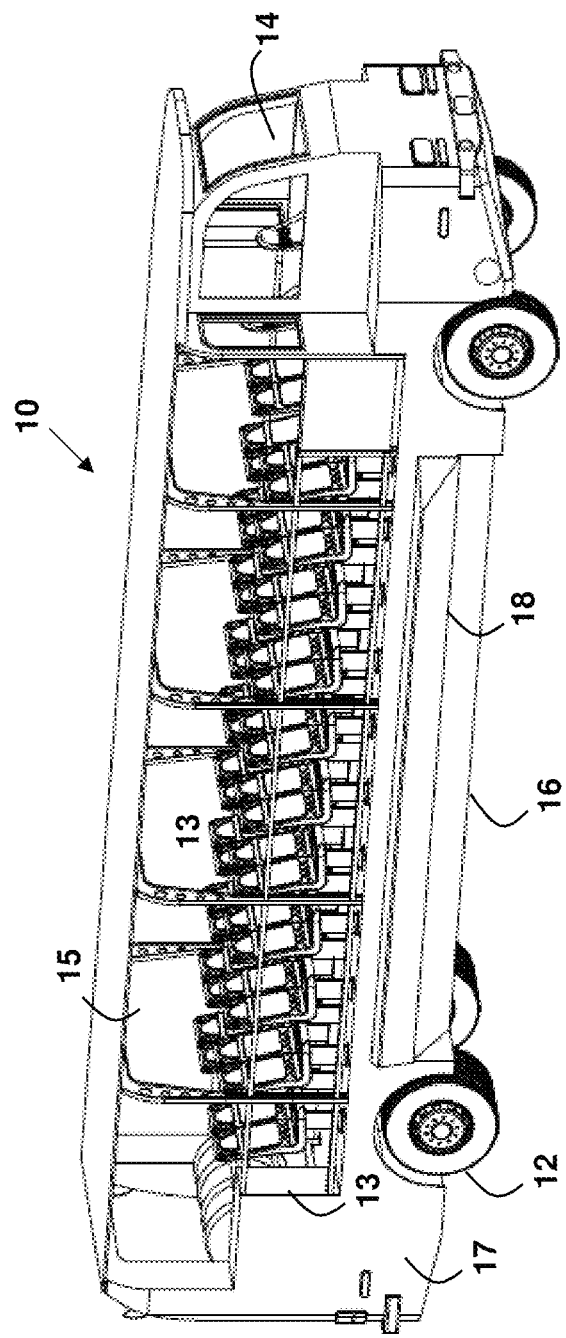
FIG. 1 is a perspective view of an amphibious vehicle according to one embodiment of the present disclosure.

Reference is made to FIG. 1, in which an amphibious vehicle 10 according to at least one embodiment of the present disclosure is illustrated. As seen in FIG. 1, the amphibious vehicle 10 comprises wheels 12, a driver compartment 14, and a passenger compartment 13.

The sides of vehicle 10 are protected by side panels 17. In the embodiment shown in FIG. 1, side panels 17 are shaped to allow room for a window 13, and open section 15, however this is not intended to be limiting.

Side panels 17 comprise recess 16 for receiving lateral floaters 18. In FIG. 1, lateral floaters 18 are shown in the deployed position, extending sideways from the side panels 17.

Lateral floaters 18 are to be deployed when the vehicle 10 is in water, or just before entering water. They are preferably made from material such as aluminum, fiberglass, carbon fiber, or steel. However, any material which is sufficiently lightweight, resilient, and economical could be used and the present disclosure is not so limited. Lateral floaters 18 are made to be buoyant, such that they weigh less than the volume of water displaced by their insertion in the water. This may be achieved by using a buoyant material or by making lateral floaters 18 hollow, or filled with very light weight material, such as foam or the like. In some embodiments, floaters 18 may be made entirely of a buoyant material such as foam, or a combination of foam and other materials such as aluminum, fiberglass, carbon fiber, or steel, amongst others.

In the embodiment shown, lateral floaters 18 have a triangular cross-section. This is more clearly illustrated in FIG. 2. When the lateral floaters 18 are deployed, a top surface 25 of the floaters 18 is horizontal, and a bottom surface 26 is diagonal. However, the present disclosure is not so limited and other cross sections are contemplated.

Lateral floaters 18 are retractable to a retracted position by rotating through arc 20, which represents the path drawn by the edge of lateral floaters 18 as they move from a deployed position to a retracted position. When the floaters 18 are in a retracted position, the width of the vehicle is reduced, which is preferable for operating the vehicle on land.

The mechanism for deploying and retracting lateral floaters 18 will be described in greater detail below.

Figure 2:
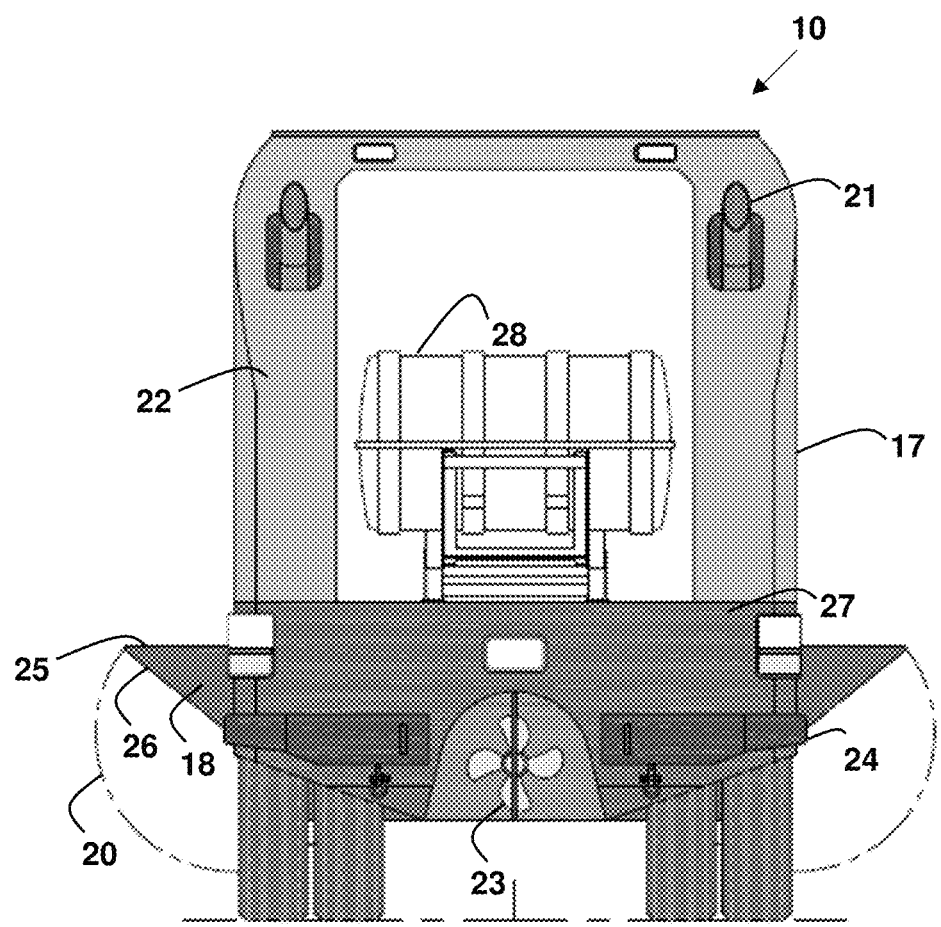
FIG. 2 is an orthogonal view of the rear of an amphibious vehicle according to one embodiment of the present disclosure.

As also shown in FIG. 2, amphibious vehicle 10 may further comprise a rear bumper 24, rear panel 22, and turn signal 21. Amphibious vehicle 10 further includes a propeller 23, located at the rear for propelling the vehicle while in water. Propeller 23 may be powered by the same motor that is powering the wheels 12 or by its own dedicated motor. For example, in one embodiment the wheels 12 may be powered by a diesel motor, and the propeller 23 may be powered by an electric motor. In another embodiment, the wheels 12 and the propeller 23 may be powered by a single electric motor.

Other combinations are within the scope of the present disclosure. In some embodiments, propeller 23 may be replaced by other suitable water propulsion systems, and the present disclosure is not so limited.

In some embodiments, amphibious vehicle 10 may also include a life raft 28 near the back of the vehicle.

Figure 3:
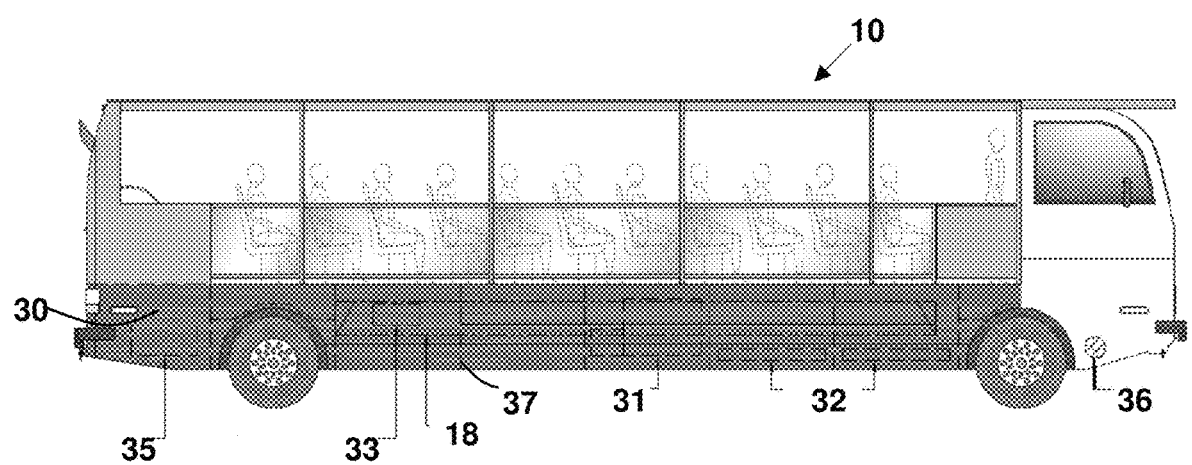
FIG. 3 is an orthogonal view of the side of an amphibious vehicle according to one embodiment of the present disclosure.

Side panels 17 and rear panel 27, in conjunction with a front panel (not shown), a top panel (not shown), and a bottom panel (not shown) form a hull, which houses electrical and mechanical component of the vehicle, and provides buoyancy to the amphibious vehicle 10, as illustrated in FIG. 3.

Specifically, as shown in FIG. 3, amphibious vehicle 10 comprises hull 30, which defines in its cavity a watertight compartment for housing mechanical and electrical components. For example, hull 30 may house a fuel tank 35, electric motor 33, diesel engine 31, and batteries 32. As is well known power from engine 31 and motor 33 may be provided to wheels 12, or to propeller 23 using conventional means.

As is well known, hull 30 comprises mostly empty space and provides buoyancy to amphibious vehicle 10. Importantly, hull 30 is water-tight. In at least some embodiments, hull 30 may be divided in sub-compartments (not shown) to ensure that the mechanical components are not destabilized in the event of an impact or other incident, and to prevent a leak from spreading throughout hull 30.

Also shown in FIG. 3 is side thruster 36. According to at least some embodiments of the present disclosure, a side thruster 36 is positioned near the front of the vehicle 10, on each side of the vehicle 10. Side thrusters 36 may be positioned within a recess of hull 30 and may be used to provide thrust to either side of the vehicle. Therefore, side thruster 36 further enhances the safety of the amphibious vehicle 10 by providing an operator of the vehicle with additional means to steer the vehicle.

Side thruster 36 may be powered by its own dedicated motor, or by electric motor 33, or by diesel engine 31. In at least one embodiment, side thrusters 36 comprise propellers directed outwardly to each side of the vehicle 10.

In at least some embodiments, the hull is divided in compartments 37. Compartments 37 comprise water tight separators which divides the hull 30 in different sections for isolating some equipment. Compartments 37 also serve to increase safety by isolating water intake in the event of a leak.

As shown in FIG. 3, the compartments 37 are divided with separators oriented transversally with respect to amphibious vehicle 10. However, compartments 37 may be oriented in any direction with respect to the vehicle. In at least one embodiment, compartments 37 are created with separators that are oriented transversally and longitudinally.

Figure 4:
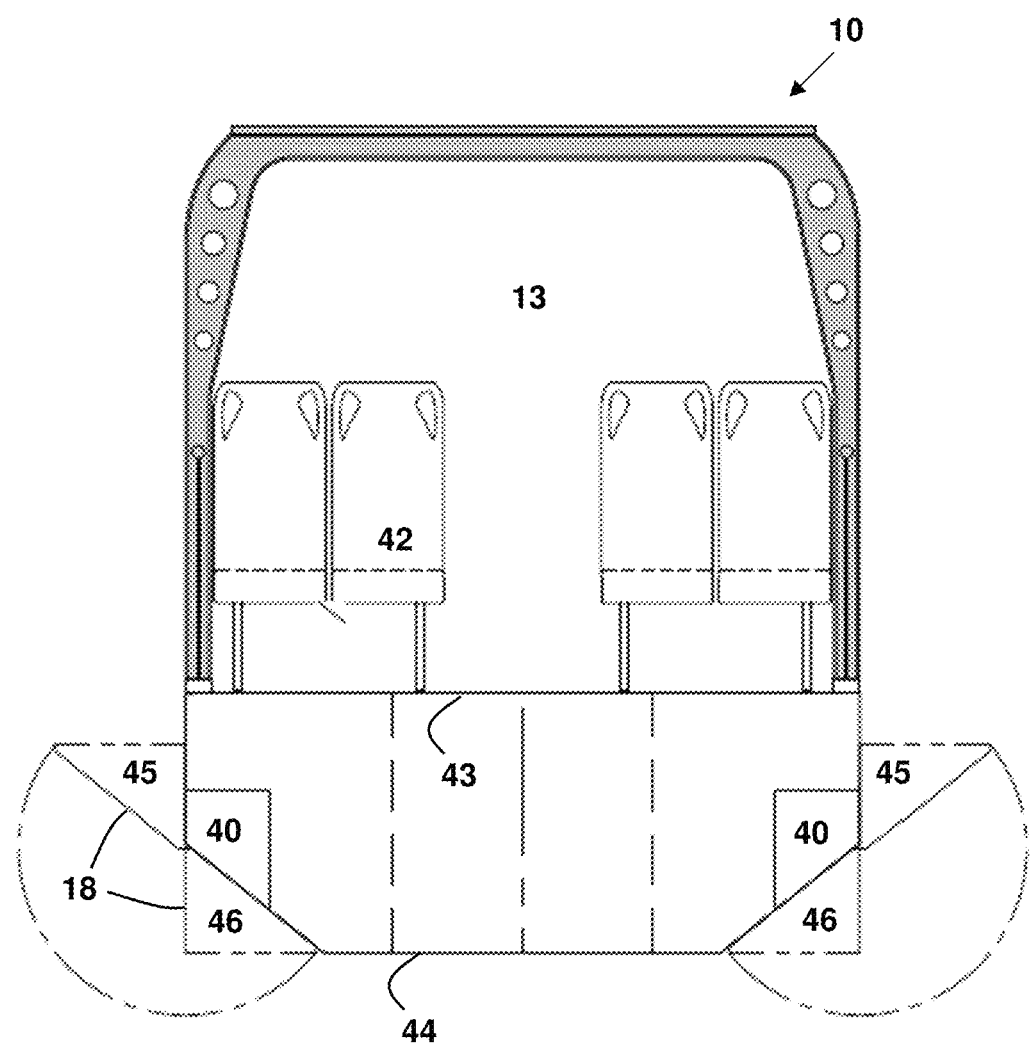
FIG. 4 is a cross-sectional view of an amphibious vehicle according to one embodiment of the present disclosure.

Reference is now made to FIG. 4.

In FIG. 4, a cross section of the amphibious vehicle 10 is shown. The lateral floaters 18 are shown in both their retracted position 46 and deployed position 45. Within hull 30, actuators 40 are positioned adjacent to the lateral floaters. Actuators 40 move lateral floaters between the retracted position 46 and the deployed position 45, when activated.

Actuators 40 may be electrically powered, or hydraulically powered, amongst other options. In at least some embodiments, actuators 40 receive power from batteries 32. As shown in FIG. 4, actuators are provided on each side for each lateral floater. Depending on the length of amphibious vehicle 10, and the length of lateral floaters 18, multiple actuators 40 may be provided on each side of the vehicle so as to reduce the work to be performed by each actuator, and to reduce the tension experienced by the lateral floaters 18 as they are moved from one position to the other.

The actuators 40 may be activated by a dashboard or control panel in driver compartment 14. Alternatively, the actuators 40 may be activated by a sensor configured to determine when amphibious vehicle 10 is entering water. In yet another embodiment, actuators 40 may be activated automatically when the water propulsion system 23 is engaged.

In the embodiment shown in FIG. 4, when lateral floaters 18 are in a retracted position, the cross section of hull 30 is rectangular. In other words, the cross-sectional shape of lateral floaters 18 correspond with a recess near the bottom of hull 30, on each side thereof, for receiving lateral floaters 18.

In at least some embodiments, the lateral floaters extend between 2 and 3 feet on each side, thereby increasing the effective width of the amphibious vehicle 10 by 4 to 6 feet. However, other sizes for the lateral floaters may be preferable depending on the full dimension of the amphibious vehicle 10, and the present disclosure is not limited in that regard.

In at least one embodiment, the retracted position of lateral floaters 18 may be situated above the deployed position. Specifically, instead of rotating upwards to move in the deployed position, lateral floaters would rotate downwards to move in the deployed position.

In at least one embodiment, the retracted position of lateral floaters 18 may be situated within hull 30, such that lateral floaters move horizontally between a retracted position within hull 30, and a deployed position outside of hull 30.

Figure 5:
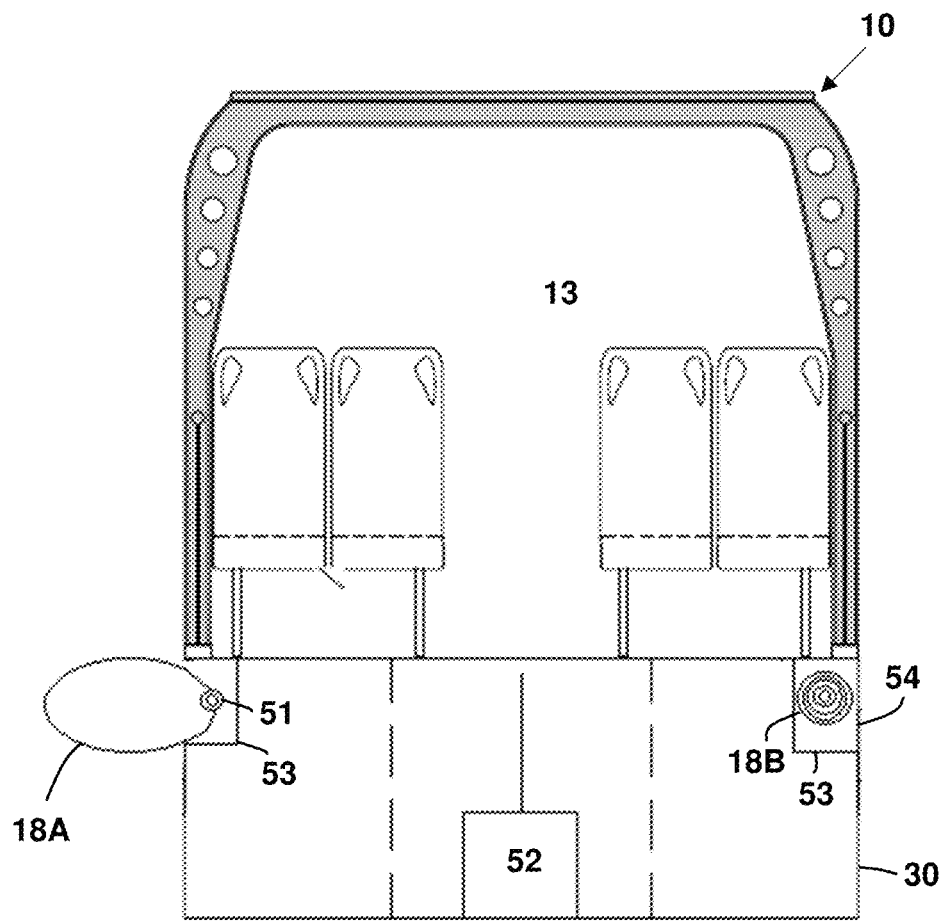
FIG. 5 is a cross-sectional view of an amphibious vehicle according to one embodiment of the present disclosure.

Reference is now made to FIG. 5 which illustrates a cross section of an amphibious vehicle 10 according to at least one embodiment of the present disclosure.

According to at least one embodiment, the lateral floaters are inflatable. In such an embodiment the lateral floaters may be made out of flexible materials such as a polyvinyl chloride (PVC) fabric, or other suitable materials.

In this embodiment, lateral floaters are deflated when in the retracted position, and inflated in the deployed position.

In FIG. 5, lateral floater 18A is shown in the inflated or deployed position, whereas lateral floater 18B is shown in the deflated or retracted position. Lateral floaters 18A and 18B are made of flexible, air-tight material suitable for being inflated and deflated, and define a space for receiving air from an air source 52 located in the hull 30 of the amphibious vehicle 10. The air source 52 may comprise a pump, or a canister of pressurized air, or other suitable means for providing air to the lateral floaters.

Lateral floaters 18A and 18B may extend substantially the length of the amphibious vehicle 10. The cross-section of lateral floaters 18A and 18B, when inflated, may be generally rectangular, triangular, or other suitable shape.

Within a recess 53 of the hull 30 are supports 51 for supporting lateral floaters 18A and 18B. According to at least one embodiment, supports 51 are rollers having a cylindrical shape extending substantially the length of lateral floaters 18A and 18B. In the deflated or retracted position, as shown with respect to floater 18B, the floater is wrapped around support 51, thereby preventing the deflated floater from interfering with other components.

In at least one embodiment, door 54 may protect the interior of recess 53 while the floaters are in the deflated or retracted position. Door 54 is moveable to allow lateral floaters 18A and 18B to extend laterally beyond the hull 30.

During operation, a driver of amphibious vehicle 10 may deploy the lateral floaters from a control panel on the vehicle dashboard (not shown). For example, the control panel may allow the driver to open door 54, and inflate the floaters by activating air source 52 which provides air to each of lateral floaters 18A and 18B via tubes (not shown).

The control panel may further allow the driver of the amphibious vehicle 10 to rotate supports 51 with an electric motor, in order to facilitate the deployment and the retraction of lateral floaters 18A and 18B.

A valve (not shown) for each of lateral floaters 18A and 18B may allow the air to escape when the floaters are being deflated and retracted, while keeping the air inside the floaters when they are being inflated and deployed. These valves may also be controllable from the control panel of amphibious vehicle 10.

In at least one embodiment, supports 51 comprise a guide bar (not shown) for ensuring the floaters are properly wrapped around support 51 when deflated and retracted. The guide bar is generally parallel to support 51 and is offset from support 51 by a distance which is sufficient for the floater to be completely wrapped around the support 51. In one embodiment, the guide bar may be pivotable and biased towards the support 51 such that the guide bar applies some pressure on the floater as support 51 is rotated to bring the floaters in a retracted position, thereby facilitating the expulsion of air from the floaters.

Accordingly, the lateral floaters may be moved from a retracted position, as shown with respect to lateral floater 18B, to a deployed position, as shown with respect to lateral floater 18A, by opening door 54, providing air to the floaters from air source 52, closing any valves on the floaters, and unrolling the floater from support 51. Similarly, the lateral floated may be moved from a deployed position, to a retracted position, by opening any valves on the floaters, and rolling the floater onto support 51, and closing door 54.

During operation on land, an amphibious vehicle according to the present disclosure preferably has its lateral floaters placed in the retracted position. As will be appreciated, by having the lateral floaters in the retracted position, the effective width of the amphibious vehicle is reduced. This is beneficial as it reduces the risk of accidents on the road. Furthermore, in some jurisdictions regulations relating to road vehicle, or to amphibious vehicles specifically, may prohibit the use of an overly wide amphibious vehicle on the road. By placing the lateral floaters in a position which does not increase the width of the vehicle, the lateral floaters may provide their benefit while the vehicle is in water, without causing problems while the vehicle is on the road.

When an amphibious vehicle according to the present disclosure is entering water, the lateral floaters may be placed in the deployed position. The lateral floaters provide greater stability to the amphibious vehicle by increasing the width of the vehicle and by increasing its buoyancy.

Therefore, an amphibious vehicle according to the present disclosure advantageously provides improved stability and operability in water combined with safety and compliance with regulations on land.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

The invention claimed is:

1. An amphibious vehicle, comprising:
a hull, defining a watertight compartment;
a plurality of ground engaging wheels operatively connected to a first power source;
a water propulsion system operatively connected to a second power source;
at least one floater extending laterally from each of a left side and a right side of the hull, wherein the at least one floater is moveable between a retracted position and a deployed position, the at least one floater being inflated in the deployed position and deflated in the retracted position;

an air source, the air source being operable to provide air to each of the at least one floater; and for each of the at least one floater, a roller extending substantially the length of the at least one floater, wherein the at least one floater is wrapped around the roller when in the retracted position.

2. The amphibious vehicle of claim 1, wherein an external surface of the at least one floater forms a continuous plane with an external surface of the hull when in the retracted position.

3. The amphibious vehicle of claim 1, further comprising, for each of the at least one floater, an actuator;

wherein activation of the actuator moves the at least one floater between the retracted position and the deployed position.

4. The amphibious vehicle of claim 1, wherein the at least one floater has a triangular cross section.

5. The amphibious vehicle of claim 3, further comprising on each of the left side and the right of the hull, a recess for receiving the at least one floater when in the retracted position.

6. The amphibious vehicle of claim 3, wherein the actuator is at least one of a hydraulic actuator or an electric actuator.

7. The amphibious vehicle of claim 6, wherein the actuator is activated manually by a driver of the amphibious vehicle.

8. The amphibious vehicle of claim 6, wherein the actuator is activated automatically when the water propulsion system is engaged.

9. The amphibious vehicle of claim 1, wherein the roller is configured to rotate in a first direction to move the at least one floater to a deployed position, and to rotate in a second direction to move the at least one floater in a retracted position.

10. The amphibious vehicle of claim 9, wherein rotation of the roller is driven by an electric motor.

11. The amphibious vehicle of claim 9, further comprising, for each of the at least one floater, a guide bar extending substantially the length of the at least one floater, the guide bar being parallel to the roller;

wherein the guide bar is offset from the roller to define a space for receiving the at least one floater.

12. The amphibious vehicle of claim 1, further comprising on each side of the hull, proximate a front end of the amphibious vehicle, side thrusters, each of said side thrusters comprising a propeller directed outwardly from the hull.

* * * * *